United States Patent
Ma et al.

(10) Patent No.: US 11,037,561 B2
(45) Date of Patent: Jun. 15, 2021

(54) METHOD AND APPARATUS FOR VOICE INTERACTION CONTROL OF SMART DEVICE

(71) Applicant: Goertek Inc., Shandong Province (CN)

(72) Inventors: Honglong Ma, Shandong Province (CN); Chuan Chen, Shandong Province (CN); Cui Liu, Shandong Province (CN)

(73) Assignee: Goertek Inc., Shandong Province (CN)

( * ) Notice: Subject to any disclaimer, the term of this patent is extended or adjusted under 35 U.S.C. 154(b) by 185 days.

(21) Appl. No.: 16/325,635

(22) PCT Filed: Jul. 20, 2017

(86) PCT No.: PCT/CN2017/093725
§ 371 (c)(1),
(2) Date: Feb. 14, 2019

(87) PCT Pub. No.: WO2018/032930
PCT Pub. Date: Feb. 22, 2018

(65) Prior Publication Data
US 2019/0214010 A1 Jul. 11, 2019

(30) Foreign Application Priority Data
Aug. 15, 2016 (CN) .......................... 201610671251.1

(51) Int. Cl.
*G10L 15/22* (2006.01)
*G05D 1/02* (2020.01)
(Continued)

(52) U.S. Cl.
CPC ................ *G10L 15/22* (2013.01); *G05D 1/02* (2013.01); *G06F 3/167* (2013.01); *G10L 15/08* (2013.01);
(Continued)

(58) Field of Classification Search
USPC ......................................... 704/251, 231, 200
See application file for complete search history.

(56) References Cited

U.S. PATENT DOCUMENTS 6,620,024 B2 * 9/2003 Choi ....................... A63H 11/00
318/568.2
8,374,721 B2 * 2/2013 Halloran .............. G05D 1/0242
700/245
(Continued)

FOREIGN PATENT DOCUMENTS

CN 1493379 A 5/2004
CN 103456306 A 12/2013
(Continued)

OTHER PUBLICATIONS

International Bureau of WIPO, International Search Report and Written Opinion for Application No. PCT/CN2017/093725, dated Oct. 18, 2017.

*Primary Examiner* — Marcus T Riley
(74) *Attorney, Agent, or Firm* — LKGlobal | Lorenz & Kopf, LLP

(57) ABSTRACT

A method and apparatus for voice interaction control of a smart device, wherein the method comprises: monitoring and collecting in real time a voice signal emitted by a user of the smart device (S11); conducting voice recognition to the collected voice signal (S12); and according to a result of the voice recognition to the voice signal by the smart device, wakening a corresponding function of the smart device and judging whether to control the smart device to move, and if yes, acquiring a position of the user and controlling the smart device to move toward the user, to shorten a distance between the smart device and the user, and then recognizing a voice signal that the user again emits; and if not, directly (Continued)

---

Monitoring and collecting in real time a voice signal emitted by a user of the smart device — S11

↓

Conducting voice recognition to the collected voice signal — S12

↓

According to a result of the voice recognition to the voice signal by the smart device, wakening a corresponding function of the smart device and judging whether to control the smart device to move, and if yes, acquiring a position of the user and controlling the smart device to move toward the user, to shorten a distance between the smart device and the user, and then recognizing a voice signal that the user again emits; and if not, directly according to the result of the voice recognition controlling the smart device to execute a corresponding operation — S13 according to the result of the voice recognition controlling the smart device to execute a corresponding operation (S13).

17 Claims, 2 Drawing Sheets

(51) Int. Cl.
*G06F 3/16* (2006.01)
*G10L 15/08* (2006.01)

(52) U.S. Cl.
CPC .. *G10L 2015/088* (2013.01); *G10L 2015/223* (2013.01)

(56) References Cited

U.S. PATENT DOCUMENTS

| | | | | |
|---|---|---|---|---|
| 8,736,228 | B1* | 5/2014 | Freed | H02J 50/90 320/115 |
| 9,493,130 | B2* | 11/2016 | Penilla | G10L 15/25 |
| 2001/0049248 | A1* | 12/2001 | Choi | A63H 11/00 446/356 |
| 2004/0066917 | A1* | 4/2004 | Yasukawa | H04M 11/04 379/88.01 |
| 2007/0250212 | A1* | 10/2007 | Halloran | A47L 9/2894 700/245 |
| 2013/0325484 | A1* | 12/2013 | Chakladar | G10L 15/22 704/275 |
| 2014/0122078 | A1 | 5/2014 | Joshi et al. | |
| 2016/0104486 | A1* | 4/2016 | Penilla | G10L 15/005 704/232 |
| 2016/0135047 | A1 | 5/2016 | Park et al. | |
| 2019/0214010 | A1* | 7/2019 | Ma | G06F 3/167 |

FOREIGN PATENT DOCUMENTS

| | | |
|---|---|---|
| CN | 204596410 U | 8/2015 |
| CN | 104985599 A | 10/2015 |
| CN | 105093986 A | 11/2015 |
| CN | 106328132 A | 1/2017 |
| KR | 20160056551 A | 5/2016 |

* cited by examiner

METHOD AND APPARATUS FOR VOICE INTERACTION CONTROL OF SMART DEVICE

CROSS REFERENCE TO RELATED APPLICATIONS

This application is a U.S. National Stage entry under 35 U.S.C. § 371 based on International Application No. PCT/CN2017/093725, filed on Jul. 20, 2017, which was published under PCT Article 21(2) and which claims priority to Chinese Patent Application No. 201610671251.1, filed on Aug. 15, 2016. These applications are hereby incorporated herein in their entirety by reference.

TECHNICAL FIELD

This application pertains to the technical field of voice interaction of smart devices, and particularly relates to a method and apparatus for voice interaction control of a smart device.

BACKGROUND

Currently, consumer smart devices usually have voice interaction function, which can recognize and understand the voice instruction of the user, and conduct voice dialogue. The conventional smart devices are usually required to conduct voice wakening before conducting voice interaction.

The process of voice wakening is mainly: the user is required to firstly speak a wake-up word, wherein the wake-up word may be preset regarding a certain particular smart device; the smart device detects the voice, extracts voice features, judges whether the extracted voice feature matches the voice feature of the preset wake-up word, and if yes, wakens the recognition function to conduct voice recognition and semantic parsing to the voice instruction emitted by the user subsequently. For example, if the user wants to chat with a smart robot, the user is required to firstly speak the wake-up word "Hali, Hali", and the smart robot collects that and recognizes out that the word in the voice signal emitted by the user matches a preset wake-up word, wakens the voice interaction function, and replies: "Hello, . . . ".

However, in the prior art, in the process of wakening the smart device and voice interaction with the smart device, the position of the smart device is fixed. When the user and the smart device have a relatively large distance, the smart device usually cannot effectively recognize the voice signal emitted by the user, which causes poor user experience. In addition, other objects, desirable features and characteristics will become apparent from the subsequent summary and detailed description, and the appended claims, taken in conjunction with the accompanying drawings and this background.

SUMMARY

The present disclosure provides a method and apparatus for voice interaction control of a smart device, to solve the problem of conventional smart devices that when relatively far from the user, they usually cannot effectively recognize the voice signal emitted by the user, which results in poor user experience.

According to an aspect of the present disclosure, there is provided a method for voice interaction control of a smart device, wherein the method comprises:

monitoring and collecting in real time a voice signal emitted by a user of the smart device;

conducting voice recognition to the collected voice signal; and according to a result of the voice recognition to the voice signal by the smart device, wakening a corresponding function of the smart device and judging whether to control the smart device to move, and if yes, acquiring a position of the user and controlling the smart device to move toward the user, to shorten a distance between the smart device and the user, and then recognizing a voice signal that the user again emits; and if not, directly according to the result of the voice recognition controlling the smart device to execute a corresponding operation.

According to another aspect of the present disclosure, there is provided an apparatus for voice interaction control of a smart device, wherein the apparatus comprises:

a signal collecting unit, for monitoring and collecting in real time a voice signal emitted by a user of the smart device;

a voice recognizing unit, for conducting voice recognition to the collected voice signal; and an interaction controlling unit, for, according to a result of the voice recognition to the voice signal by the smart device, wakening a corresponding function of the smart device and judging whether to control the smart device to move, and if yes, acquiring a position of the user and controlling the smart device to move toward the user, to shorten a distance between the smart device and the user, and then recognizing a voice signal that the user again emits; and if not, directly according to the result of the voice recognition controlling the smart device to execute a corresponding operation.

The advantageous effects of the present disclosure are: the technical solution of voice interaction control of the present disclosure comprises monitoring and collecting in real time a voice signal emitted by a user of the smart device, and conducting voice recognition to the collected voice signal; and according to a result of the voice recognition to the voice signal by the smart device, wakening a corresponding function of the smart device and, if required, controlling the smart device to move, to shorten a distance between the smart device and the user, and then recognizing a voice signal that the user again emits. Accordingly, the present disclosure realizes the advantageous effect of, when the effect of far-field voice recognition is poor, controlling the smart device to move to be near the speaker, and then conducting near-field voice recognition again, to improve the voice recognition degree, which compensates for the disadvantage that the effect of far-field voice recognition is poor and the smart device cannot effectively recognize the voice of the user, and optimizes the user voice interaction experience.

BRIEF DESCRIPTION OF DRAWINGS

The present invention will hereinafter be described in conjunction with the following drawing figures, wherein like numerals denote like elements, and.

DETAILED DESCRIPTION

The following detailed description is merely exemplary in nature and is not intended to limit the invention or the application and uses of the invention. Furthermore, there is no intention to be bound by any theory presented in the preceding background of the invention or the following detailed description.

The design concept of the present disclosure is: the technical solution of the present disclosure recognizes a first voice signal emitted by the user, and when the voice signal cannot be effectively recognized out at the initial position (far field) of the smart device, according to the voice recognition result controls the smart device to move toward the user to a preset position (near field), to shorten the distance between the smart device and the user, and when moving to the near field, interacts with the user again, thereby adaptively adjusting the position according to the voice signal of the user, to accurately recognize out the instruction in the voice signal of the user, and optimize the user voice interaction experience.

The following embodiments of the present disclosure particularly describe the application of the solution of voice interaction control of the present disclosure by taking a smart robot as an example.

The modes of the wakening of the voice interaction with the smart robot are usually two. One is single wake-up word wakening. For example, before the voice interaction, the user is required to firstly emit a wake-up word, for example "Hali, Hali", and after hearing the reply of the robot (for example, "Hi, I am Hali . . . "), the user then emits a commanding word, for example "I want to hear a story". Such a wakening mode requires the speaker to wait for a duration after speaking the wake-up word and then emit the commanding word, which does not meet the normal speaking habit of users.

An improved mode is wake-up word plus commanding word simultaneous recognition mode. For example, the user, before the voice interaction, emits the voice instruction "Hali, Hali, I want to hear a story". However, since the distance between the user and the smart robot is uncertain, when the distance between the user and the smart robot is relatively large, the long distance voice pickup effect of the smart robot is poor, and the recognition of the commanding word usually has certain deviation, which in turn results in non-ideal user interaction experience.

Accordingly, the embodiments of the present disclosure provide a solution of voice interaction control, to improve the problem of poor long distance voice pickup effect of the smart robot.

The First Embodiment

Figure 1:
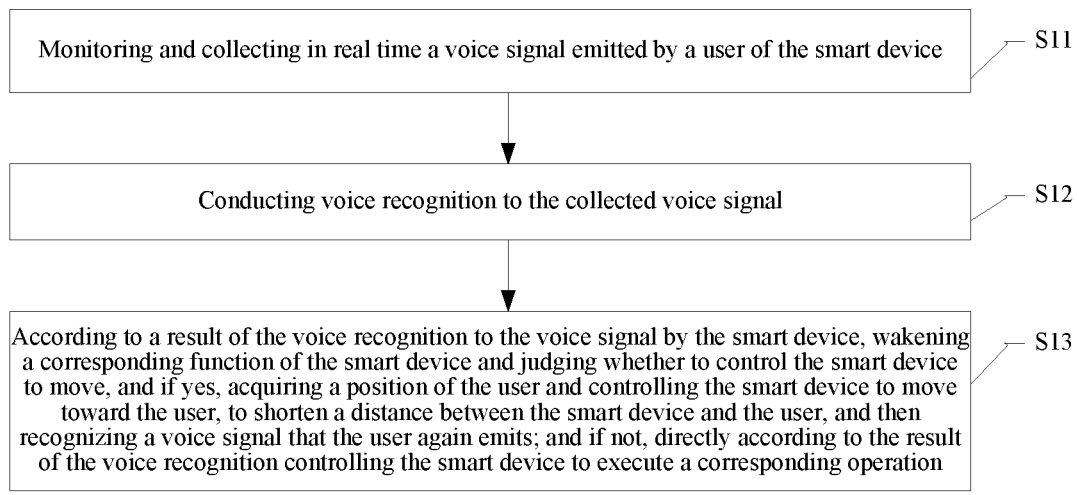
FIG. 1 is a schematic flow diagram of the method for voice interaction control of a smart device of an embodiment of the present disclosure.

FIG. 1 is a schematic flow diagram of the method for voice interaction control of a smart device of an embodiment of the present disclosure. Referring to FIG. 1, the method for voice interaction control comprises:

Step S11, monitoring and collecting in real time a voice signal emitted by a user of the smart device;

Step S12, conducting voice recognition to the collected voice signal; and

Step S13, according to a result of the voice recognition to the voice signal by the smart device, wakening a corresponding function of the smart device and judging whether to control the smart device to move, and if yes, acquiring a position of the user and controlling the smart device to move toward the user, to shorten a distance between the smart device and the user, and recognizing a voice signal that the user again emits; and if not, directly according to the result of the voice recognition controlling the smart device to execute a corresponding operation.

Here, the step of wakening a corresponding function of the smart device may comprise: wakening the voice interaction function of the smart device. In the process of practical applications, the smart device, when no user is talking with it, may be in the hibernation/standby state to save the power consumption. In addition, the smart device may be provided with a microphone array, for monitoring and collecting in real time the voice signal emitted by the user of the smart device.

It can be known from the method shown in FIG. 1 that, the method recognizes the voice signal emitted by the user, and when the result of the voice recognition is not ideal, controls the smart device to move toward the user, to shorten the distance between the user and the smart device, and when it has moved to a position closer to the user, recognizes again the voice signal emitted by the user (for example, recognizing a commanding word emitted by the user), thereby realizing, when the recognizing effect is poor, controlling the device to move to be near the speaker, to conduct near-field voice recognition, which overcomes the disadvantage of the poor effect of far-field voice recognition. In addition, the user is merely required to emit the voice instruction for one time, to simultaneously complete the functions of wakening, instruction recognizing and position moving, which optimizes the user experience.

The Second Embodiment

Figure 2:
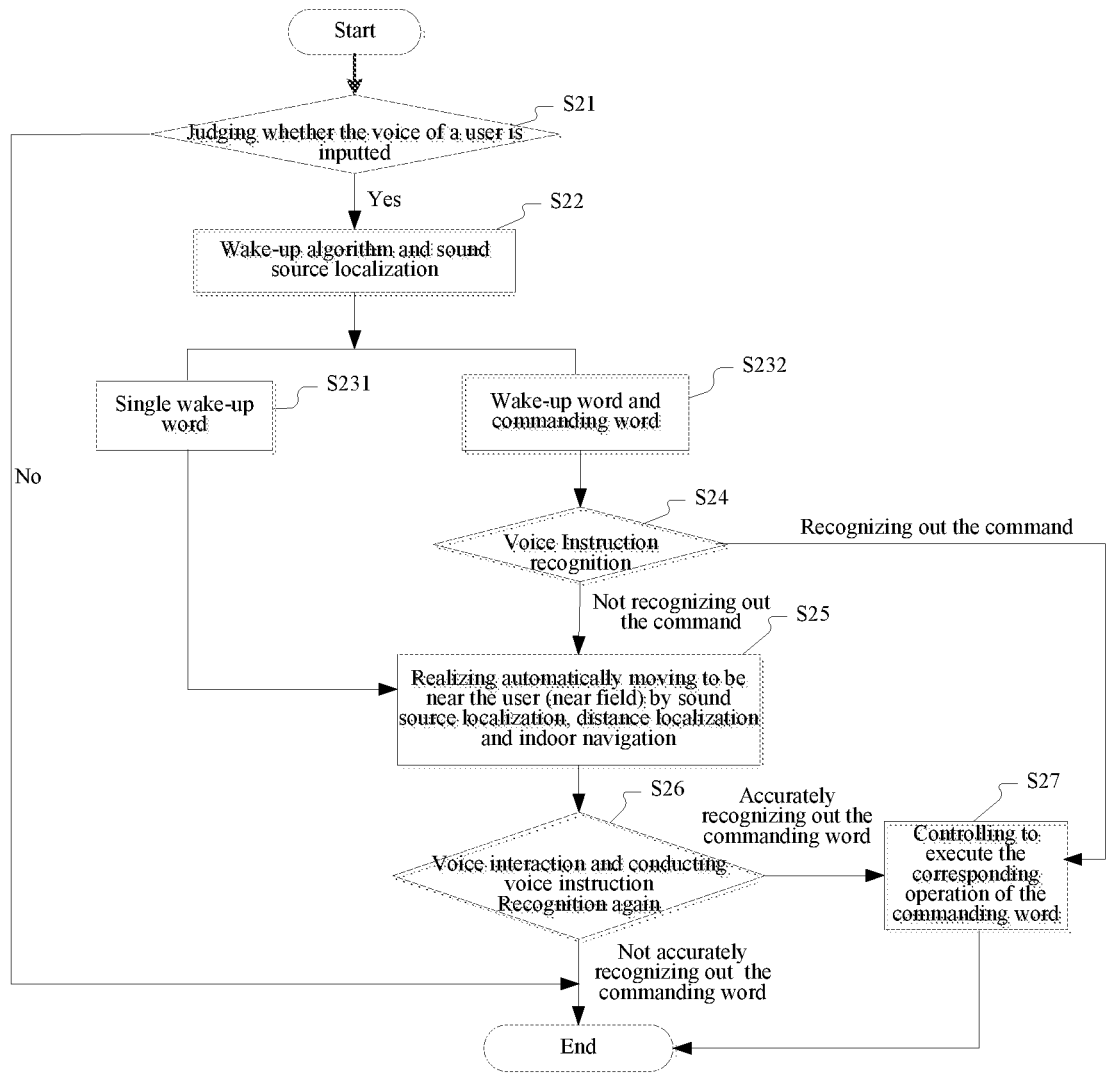
FIG. 2 is a schematic flow diagram of the method for voice interaction control of a smart device of an embodiment of the present disclosure.

FIG. 2 is a schematic flow diagram of the method for voice interaction control of a smart device of an embodiment of the present disclosure. The implementing steps and principle of the method for voice interaction control of the embodiment of the present disclosure are exemplarily described below in combination with FIG. 2. Referring to FIG. 2, the method of the present embodiment comprises the following Step S21 to Step S27.

The flow starting,

Executing Step S21, judging whether the voice of a user is inputted; and if yes, executing Step S22, and if not, ending the flow.

Step S22, executing a wake-up algorithm and sound source localization.

After the voice signal emitted by the user is collected, a processor in the smart robot starts the voice signal processing function and executes a wake-up algorithm and sound source localization according to the voice signal.

Figure 3:
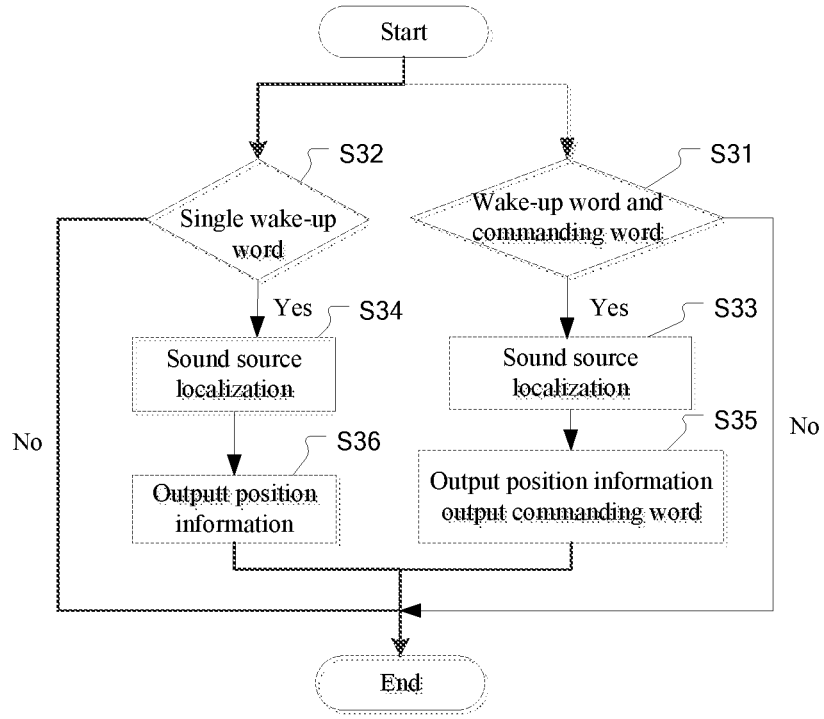
FIG. 3 is a schematic diagram of the principle of the voice recognition and the sound source localization of an embodiment of the present disclosure.

FIG. 3 is a schematic diagram of the principle of the voice recognition and the sound source localization of the present disclosure. In the present embodiment, the step of conducting voice recognition to the collected voice signal comprises: recognizing out a wake-up word from the collected voice signal;

The step of according to a result of the voice recognition to the voice signal by the smart device, wakening a corresponding function of the smart device and judging whether to control the smart device to move comprises: when the recognized-out wake-up word matches a saved preset wake-up word, wakening a corresponding function of the smart device and controlling the smart device to move;

or, the conducting voice recognition to the collected voice signal comprises: recognizing out a wake-up word and a commanding word from the collected voice signal; and the according to a result of the voice recognition to the voice signal by the smart device, wakening a corresponding function of the smart device and judging whether to control the smart device to move comprises: when the recognized-out wake-up word matches a saved preset wake-up word and the recognized-out commanding word does not match a saved preset commanding word, wakening a corresponding function of the smart device and controlling the smart device to move; and when the recognized-out wake-up word matches a saved preset wake-up word and the recognized-out commanding word matches a saved preset commanding word, wakening a corresponding function of the smart device and according to an instruction of the commanding word controlling the smart device to execute the corresponding operation.

Referring to FIG. 3, the method comprises the following steps:

The flow starting,

Executing Step S32: conducting voice signal recognition to the collected voice signal, and when it is determined that the voice signal contains merely a wake-up word, recognizing the wake-up word, to obtain a single wake-up word recognizing result; or executing Step S31: conducting voice signal recognition to the collected voice signal, and when it is determined that the voice signal contains both a wake-up word and a commanding word (or a commanding sentence), recognizing the wake-up word and the commanding word, to obtain a wake-up word plus commanding word recognizing result.

In Step S32, when the single wake-up word voice recognition result (for example, "Hali Hali") is obtained, the method may control to waken the smart robot and wait for the user speaking again. In Step S31, when the wake-up word plus commanding word recognizing result (for example, "Hali Hali, I want to hear a story") is obtained, the method may waken the smart robot according to the recognized-out wake-up word, and control the smart robot to conduct the corresponding operation according to the instruction of the commanding word. Accordingly, the interaction demands of the smart robot that support different wakening recognition modes are satisfied.

For example, regarding smart robots that support the single wake-up word recognition mode, the method may select to execute Step S32 and the subsequent steps. Moreover, regarding smart robots that support the recognition mode of simultaneously recognizing the wake-up word plus the commanding word, when the wakening voice instruction comprises a commanding word the method may execute in the sequence of Step S31→Step S33→Step S35.

In the present embodiment, the according to a result of the voice recognition to the voice signal by the smart device, wakening a corresponding function of the smart device and judging whether to control the smart device to move comprises three cases, which individually are:

The first case is, when the recognized-out wake-up word matches a saved preset wake-up word, wakening a corresponding function of the smart device and controlling the smart device to move. This case supports the single wake-up word wakening mode. That is, the user can, by merely speaking a preset wake-up word, waken the voice interaction function of the smart robot, and trigger the movement controlling function in the robot to realize the effect of moving to be near the user.

The second case is, when the recognized-out wake-up word matches a saved preset wake-up word and the recognized-out commanding word does not match a saved preset commanding word, wakening a corresponding function of the smart device and controlling the smart device to move. This case supports the wake-up word plus commanding word wakening mode. That is, when the smart robot can recognize that the user speaks the preset wake-up word and a uncertain commanding word, but the smart device cannot accurately recognize out whether the commanding word is the preset commanding word due to reasons such as the fuzziness of the voice and the interference by environment noise, the method may waken the corresponding function of the smart robot for example the voice interaction function, and trigger the movement controlling function in the robot to realize the effect of moving to be near the user; and when it has moved to be near the user, control the smart robot to guide the user to speak the commanding word again, thereby more effectively recognizing out the commanding word spoken by the user on the basis of near-field voice recognition.

The third case is, when the recognized-out wake-up word matches a saved preset wake-up word and the recognized-out commanding word matches a saved preset commanding word, wakening a corresponding function of the smart device and according to an instruction of the commanding word controlling the smart device to execute the corresponding operation. This case also supports the wake-up word plus commanding word wakening mode. When the preset wake-up word and preset commanding word spoken by the user can be recognized out, the method controls the smart robot to directly according to the instruction of the commanding word execute the corresponding action, and the smart robot is not required to be controlled to move. In this case, since the wake-up word and the commanding word can be accurately recognized out, it is indicated that the distance between the smart robot and the user is appropriate, and at this point the robot may not be controlled to move and the action required by the user may be directly executed, to provide the user with a natural and smooth interaction experience.

It should be noted that, how to conduct voice recognition to the voice signal emitted by the user is not a key of the embodiments of the present disclosure, and can be implemented by using any available technical means of the prior art, and the technical details that are not described in the present embodiment can be seen in the prior art, which is not discussed here further.

According to the result of the voice signal recognition in Step S32, after the wake-up word is recognized out, Step S34 is executed to locate the sound source. That is, sound source localization is conducted according to the voice signal emitted by the user this time that contains merely the wake-up word.

According to the result of the voice signal recognition in Step S31, after the wake-up word and the commanding word are recognized out, Step S33 is executed to locate the sound source. That is, sound source localization is conducted according to the voice signal emitted by the user this time that contains both the wake-up word and the commanding word.

It should be noted that, in the present embodiment, the executing sequence of the sound source localization and the voice recognition is not strictly limited. That is, the sound source localization may be executed simultaneously with the voice recognition; or the sound source localization is firstly executed and then the voice recognition is executed; or the voice recognition is firstly executed and then the sound source localization is executed.

The sound source localization refers to accurately locating the sound source by calculating the time difference and sound intensity difference of the sounds that are emitted by the user and arrive at the smart robot, to determine the direction or position of the user. For example, the prior art may use a microphone (MIC) array, usually a circular MIC (for example 4+1) or (6+1), to complete a 360° sound source localization; or, use linear double MICs or four MICs to complete a 180° sound source localization. Here, the sound source localization in Step S33 and Step S34 may be implemented by using the prior art, and the implementation processes of the sound source localization in Step S33 and Step S34 may be the same.

After Step S34, Step S36 is executed to output position information. After Step S33, Step S35 is executed to output position information and output the commanding word.

Here, the outputting position information in Step S35 and Step S36 refers to outputting the distance and direction information of the user (that is, the speaker) relative to the smart robot to the process of the smart robot to trigger its movement controlling and processing function, so that the process can, according to the direction or position information of the user, conduct movement controlling if required, to shorten the distance between the user and the smart robot. The flow ends.

It can be known from FIG. 3 that, when the user conducts voice interaction with the smart robot and emits the voice signal, the processor of the smart robot starts the voice recognition function, by using a voice recognition algorithm, recognizes out the wake-up word in the voice signal emitted by the user this time, or simultaneously recognizes out the wake-up word and the commanding word in the voice signal, and then can obtain two voice recognition results, as shown by Step S231 and Step S232 in FIG. 2.

Step S231, single wake-up word; Step S232, wake-up word and commanding word.

Here, similarly to Step S31 and Step S32 in FIG. 3, the flow may select one branch to execute according to the particular condition of the smart robot.

If in Step S231 it is recognized out that the voice signal currently emitted by the user is a single wake-up word, the smart robot may directly execute Step S25, to automatically move to be near the user by sound source localization, distance localization and indoor navigation.

In the present embodiment, the acquiring a position of the user and controlling the smart device to move toward the user comprises: according to the collected voice signal, calculating by sound source localization to obtain position information of a sound source relative to the smart device, and according to the position information determining a distance and direction of the user relative to the smart device; and by using the determined distance and direction of the user relative to the smart device, controlling the smart device to move toward the user, to shorten a distance between the smart device and the user, and then recognizing a voice signal that the user again emits.

Exemplarily, the method of the present embodiment firstly determines the position information (including distance information and direction information) of the user relative to the smart robot by sound source localization, and then controls the smart device to move toward the user to a first preset position, wherein a distance between the first preset position and the user is less than a first distance threshold. For example, if it is determined according to sound source localization that the distance between the user and the smart robot is 5 meters, and the first distance threshold is for example 3 meters, then the smart robot may be controlled to move to the first preset position that is 2.5 meters from the user.

Then, judging whether to control the smart device to move again according to a result of the voice recognition to the voice signal that the user again emits by the smart device, and if yes, controls the smart device to move toward the user to a second preset position, wherein a distance between the second preset position and the user is less than a second distance threshold. Continuing with the above example, after the smart robot has moved to the first preset position that is 2.5 meters from the user, judging whether to control the smart device to move again according to the voice recognition result of the voice signal that the user again emits, and if yes, controls the smart device to move toward the user to a second preset position, wherein a distance between the second preset position and the user is less than a second distance threshold, and the second distance threshold is less than the first distance threshold.

For example, if the commanding word in the voice signal of the user still cannot be effectively recognized out at the first preset position that is 2.5 meters from the user, it may be considered to further shorten the distance between the user and the smart robot to improve the voice recognition degree.

If in Step S232 it is recognized out that the voice signal currently emitted by the user contains both the wake-up word and the commanding word, executes Step S24.

Step S24, recognizing voice instruction, and if the command is recognized out, executing Step S27, and if the command is not recognized out, executing Step S25.

Step S25, realizing automatically moving to be near the user (near field) by sound source localization, distance localization and indoor navigation.

In the present embodiment, the controlling the smart device to move toward the user is realized particularly by sound source localization, distance localization and indoor navigation algorithm. That is, the by using the determined distance and direction of the user relative to the smart device, controlling the smart device to move toward the user, to shorten a distance between the smart device and the user comprises:

determining by distance localization position coordinates of the user and current position coordinates of the smart device in an indoor space, according to the determined position coordinates of the user and a preset first distance threshold, calculating to obtain corresponding position coordinates of the first preset position, by indoor navigation, generating a preset path that uses the current position coordinates of the smart device as a starting point and the corresponding position coordinates of the first preset position as an end point, and controlling in real time the smart device to move to the first preset position along the preset path and with a preset constant step length.

That is in detail described below.

Firstly, the present embodiment, according to the collected voice signal spoken by the user, calculates by sound source localization to obtain position information of the sound source (that is, the speaker) relative to the smart device, and according to the position information determines a distance and direction of the user relative to the smart device.

Subsequently, after the distance and direction of the user relative to the smart device are determined, the position coordinates of the user and current position coordinates of the smart device in an indoor space are determined by distance localization method, and according to the determined position coordinates of the user and a preset first distance threshold, it is calculated to obtain corresponding position coordinates of the first preset position. Here the distance localization has two particular implementing approaches. One is visual recognition, for example, 3D depth vision, which, by using a camera that has depth information collecting function, can recognize three-dimensional stereo data beyond the plan image, and directly obtain a depth distance information of the user in the indoor space. Another implementing approach is infrared ray distance measurement, which recognizes and determines particular position coordinates of the user in the indoor space by using an infrared sensor.

Finally, by indoor navigation, it is generated a preset path that uses the current position coordinates of the smart device as a starting point and the corresponding position coordinates of the first preset position as an end point, and it is controlled in real time the smart device to move to the first preset position according to the preset path and with a preset constant step length.

Here the indoor navigation may also be implemented by using the prior art. For example, SLAM (Simultaneous Localization and Mapping) can enhance the capacity of environment perception of the robot, and on the precondition of not relying on Wi-Fi or Bluetooth, can independently perceive the indoor environment where the robot is located and assist the smart robot in establishing a three-dimensional data production and environment perception system in an indoor scene, to assist the robot in independently walking.

It should be noted that, in the present embodiment, in particular navigation, the smart robot is controlled to move according to a preset constant step length; that is, the robot is controlled to move by a constant distance every step to approach the speaker, to obtain a better voice recognition effect.

Step S26, executing voice interaction and conducting voice instruction recognition again, and if an accurate commanding word is recognized, controlling to execute the corresponding operation of the commanding word; and if the commanding word still cannot be accurately recognized, returning to execute Step S25 or directly ending.

In the present embodiment, after controlling the smart robot to move to a suitable position (for example a position that is 1 meter from the user), may control the smart robot to speak some guiding words, to guide the user to speak the commanding word again, and conduct voice instruction recognition again; and if the commanding word can be correctly recognized out at the position, controls to execute the corresponding operation of the commanding word, to satisfy the usage demand of the user; and if the commanding word still cannot be accurately recognized out, returns to execute Step S25, and continues to control the smart robot to move, to shorten the distance between the smart robot and the user, and avoid that the smart robot cannot accurately recognize out the commanding word spoken by the user due to the large distance between the smart robot and the user; or, directly ends the flow.

In the present embodiment, the times of voice recognition may be limited, that is setting a threshold of the times of voice recognition, for example three. If the smart robot still cannot effectively recognize out the commanding word after the user has spoken the commanding word for three times and correspondingly the voice recognition has been conducted for three times, it may control to end the flow, to ensure providing good user interaction experience. Optionally, when the smart robot does not accurately recognize out the commanding word, it sets a threshold of the times of not accurately recognizing out the commanding word, accumulates the times of the commanding word recognition, and when the times of not accurately recognizing out the commanding word exceeds the threshold of times, controls the smart robot to move, to shorten the distance between the smart robot and the user. The reason for setting the times of not accurately recognizing out the commanding word is to prevent that in practical applications, the commanding word is not accurately recognized out due to too small speaking voice of the user rather than due to too large distance between them, wherein at this point controlling the smart robot to move cannot solve the problem and increases the system power consumption.

Accordingly, the method for voice interaction control of the embodiments of the present disclosure optimizes the flow of the smart device from wakening to entering the working state, and ensures that the smart device can support the two working states, i.e., single wake-up word wakening or simultaneously recognizing wake-up word plus commanding word to directly conduct actions of command instruction, and when it is recognized out that the commanding word spoken by the user is not clear, may by sound source localization assist in controlling the smart device to move to be near the user and interact, which improves the recognition rate of the voice recognition, provides the user with a natural and smooth interaction experience, and solves the problem of poor interaction experience caused by the unfamiliarity of the user to the interaction flow.

The Third Embodiment

The present embodiment illustrates a particular application scene of the method for voice interaction control of a smart device of an embodiment of the present disclosure.

In the present embodiment, the smart device is exemplarily a service robot, and the service robot is capable of executing the method for voice interaction control of a smart device of the embodiments of the present disclosure.

The service robot and Xiao Ming, 3 years old, are in a living room, Xiao Ming conducts voice wakening to the service robot, and if the service robot is not wakened, the service robot has no response at all.

The initial distance between Xiao Ming and the service robot is within 2 meters. Xiao Ming speaks to the service robot: "Hali, I want to hear a story.", and if the service robot does not hear that clearly, the service robot asks: "I did not hear that clearly, please say it again."

Simultaneously, the service robot calculates out the direction of the voice emitted by Xiao Ming according to the sound signal emitted by Xiao Ming, turns its face to the direction to respond, moves to be near Xiao Ming (with a distance within 1 meter), and recognizes the voice signal emitted by Xiao Ming again. When recognizing out that the preset commanding word emitted by Xiao Ming again is "tell a story", the service robot searches for a story audio that was in advance recorded and saved and plays it, to complete the action required by Xiao Ming.

The Fourth Embodiment

Figure 4:
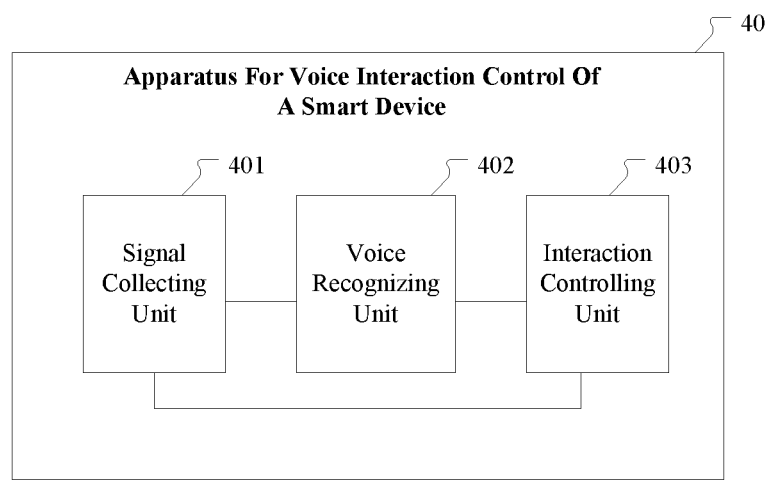
FIG. 4 is a structural block diagram of the apparatus for voice interaction control of a smart device of an embodiment of the present disclosure.

FIG. 4 is a structural block diagram of the apparatus for voice interaction control of a smart device of an embodiment of the present disclosure. Referring to FIG. 4, the apparatus 40 for voice interaction control of a smart device comprises:

a signal collecting unit 401, for monitoring and collecting in real time a voice signal emitted by a user of the smart device;

a voice recognizing unit 402, for conducting voice recognition to the collected voice signal; and an interaction controlling unit 403, for, according to a result of the voice recognition to the voice signal by the smart device, wakening a corresponding function of the smart device and judging whether to control the smart device to move, and if yes, acquiring a position of the user and controlling the smart device to move toward the user, to shorten a distance between the smart device and the user, and then recognizing a voice signal that the user again emits; and if not, directly according to the result of the voice recognition controlling the smart device to execute a corresponding operation.

In the present embodiment, the interaction controlling unit 403 is particularly for controlling the smart device to move toward the user to a first preset position, wherein a distance between the first preset position and the user is less than a first distance threshold;

and/or, the interaction controlling unit 403 is further for, according to a result of the voice recognition to the voice signal that the user again emits by the smart device, judging whether to again control the smart device to move again, and if yes, controlling the smart device to move toward the user to a second preset position, wherein a distance between the second preset position and the user is less than a second distance threshold.

In an embodiment of the present disclosure, the voice recognizing unit 402 is for recognizing out a wake-up word from the collected voice signal;

the interaction controlling unit 403 is for, when the recognized-out wake-up word matches a saved preset wake-up word, wakening a corresponding function of the smart device and controlling the smart device to move;

the voice recognizing unit 402 is further for recognizing out a wake-up word and a commanding word from the collected voice signal; and the interaction controlling unit 403 is for, when the wake-up word matches a saved preset wake-up word and the commanding word does not match a saved preset commanding word, wakening a corresponding function of the smart device and controlling the smart device to move; and when the wake-up word matches a saved preset wake-up word and the commanding word matches a saved preset commanding word, wakening a corresponding function of the smart device and according to an instruction of the commanding word controlling the smart device to execute the corresponding operation.

In an embodiment of the present disclosure, the interaction controlling unit 403 is further for, according to the collected voice signal, calculating by sound source localization to obtain position information of a sound source relative to the smart device, and according to the position information determining a distance and direction of the user relative to the smart device; by using the determined distance and direction of the user relative to the smart device, controlling the smart device to move toward the user, to shorten a distance between the smart device and the user, and then recognizing a voice signal that the user again emits.

In an embodiment of the present disclosure, the interaction controlling unit 403 is further for determining by distance localization position coordinates of the user and current position coordinates of the smart device in an indoor space, according to the determined position coordinates of the user and a preset first distance threshold, calculating to obtain corresponding position coordinates of the first preset position, by indoor navigation generating a preset path that uses the current position coordinates of the smart device as a starting point and the corresponding position coordinates of the first preset position as an end point, and controlling in real time the smart device to move to the first preset position along the preset path and with a preset constant step length.

By using the apparatus for voice interaction control of a smart device shown in FIG. 4, when the user emits a voice instruction, the apparatus for voice interaction control automatically realizes voice wakening and sound source localization; if the smart device is wakened, sends the voice data to the wakened master program to realize instruction recognition; if the instruction recognition is correct, directly executes the instruction operation; and if the confidence level of the recognition is relatively low, locates the direction of the speaker by using the result of the sound source localization, determines the particular position of the speaker by distance localization (such as visual recognition and infrared), and then by indoor navigation technique (such as SLAM algorithm) controls the smart device to move to be near the speaker, to realize near-field (for example, within a distance of 1 meter to the user) voice interaction, and realizes voice instruction recognition again, to improve the voice recognition degree.

Corresponding to the above method for voice interaction control of a smart device, the present application further provides an apparatus for voice interaction control of a smart device, wherein the apparatus comprises a processor and a machine readable storage medium, the machine readable storage medium stores machine executable instructions that are executable by the processor, and the processor executes the machine executable instructions to implement the steps of the above method for voice interaction control of a smart device.

It should be noted that, the apparatus for voice interaction control of a smart device of the present embodiment corresponds to the above method for voice interaction control of a smart device, and therefore the part of the implementing steps of the apparatus for voice interaction control of a smart device that is not described in the present embodiment may be seen in the relative description of the above embodiments of the present disclosure, which is not discussed here further.

The technical solution of voice interaction control of the present disclosure comprises monitoring and collecting in real time a voice signal emitted by a user of the smart device, and conducting voice recognition to the collected voice signal; and according to a result of the voice recognition to the voice signal by the smart device, wakening a corresponding function of the smart device and judging whether to control the smart device to move, and if yes, acquiring a position of the user and controlling the smart device to move toward the user, to shorten a distance between the smart device and the user, and then recognizing a voice signal that the user again emits; and if not, directly according to the result of the voice recognition controlling the smart device to execute a corresponding operation. Accordingly, the present disclosure realizes the advantageous effect of, when the effect of far-field voice recognition is poor, controlling the smart device to automatically move to be near the speaker, and then conducting near-field voice recognition again, to improve the voice recognition degree, which compensates for the disadvantage that the effect of far-field voice recognition is poor and the smart device cannot effectively recognize the voice of the user, and optimizes the user voice interaction experience.

The above descriptions are merely preferable embodiments of the present disclosure, and are not limiting the protection scope of the present disclosure. Any modifications, equivalent substitutions or improvements that are made within the spirit and principle of the present disclosure are all included in the protection scope of the present disclosure.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment, it being understood that various changes may be made in the function and arrangement of elements described in an exemplary embodiment without departing from the scope of the invention as set forth in the appended claims and their legal equivalents.

What is claimed is:

1. A method for voice interaction control of a smart device, wherein the method comprises:
   monitoring and collecting in real time a voice signal emitted by a user of the smart device;
   conducting voice recognition to the collected voice signal; and
   according to a result of the voice recognition to the voice signal by the smart device, wakening a corresponding function of the smart device and judging whether to control the smart device to move, and if yes, acquiring a position of the user and controlling the smart device to move toward the user, to shorten a distance between the smart device and the user, and then recognizing a voice signal that the user again emits; and if not, directly according to the result of the voice recognition controlling the smart device to execute a corresponding operation;
   acquiring a position of the user and controlling the smart device to move toward the user comprises:
   according to the collected voice signal, calculating by sound source localization to obtain position information of a sound source relative to the smart device, and according to the position information determining a distance and direction of the user relative to the smart device; and
   by using the determined distance and direction of the user relative to the smart device, controlling the smart device to move toward the user.

2. The method according to claim 1, wherein the step of acquiring a position of the user and controlling the smart device to move toward the user comprises:
   controlling the smart device to move toward the user to a first preset position, wherein a distance between the first preset position and the user is less than a first distance threshold.

3. The method according to claim 2, wherein the method further comprises:
   according to a result of the voice recognition to the voice signal that the user again emits by the smart device, judging whether to control the smart device to move again, and if yes, controlling the smart device to move toward the user to a second preset position, wherein a distance between the second preset position and the user is less than a second distance threshold.

4. The method according to claim 1, wherein the step of conducting voice recognition to the collected voice signal comprises: recognizing out a wake-up word from the collected voice signal; and
   the step of according to a result of the voice recognition to the voice signal by the smart device, wakening a corresponding function of the smart device and judging whether to control the smart device to move comprises:
   when the recognized-out wake-up word matches a saved preset wake-up word, wakening a corresponding function of the smart device and controlling the smart device to move.

5. The method according to claim 1, wherein the step of by using the determined distance and direction of the user relative to the smart device, controlling the smart device to move toward the user comprises:
   determining by distance localization position coordinates of the user and current position coordinates of the smart device in an indoor space,
   according to the determined position coordinates of the user and a preset first distance threshold, calculating to obtain corresponding position coordinates of the first preset position, and
   by indoor navigation, generating a preset path that uses the current position coordinates of the smart device as a starting point and the corresponding position coordinates of a first preset position as an end point, and controlling in real time the smart device to move to the first preset position along the preset path and with a preset constant step length.

6. The method according to claim 1, wherein the step of conducting voice recognition to the collected voice signal comprises: recognizing out a wake-up word and a commanding word from the collected voice signal; and
   the step of according to a result of the voice recognition to the voice signal by the smart device, wakening a corresponding function of the smart device and judging whether to control the smart device to move comprises:
   when the recognized-out wake-up word matches a saved preset wake-up word and the recognized-out commanding word does not match a saved preset commanding word, wakening a corresponding function of the smart device and controlling the smart device to move; and
   when the recognized-out wake-up word matches a saved preset wake-up word and the recognized-out commanding word matches a saved preset commanding word, wakening a corresponding function of the smart device and according to an instruction of the commanding word controlling the smart device to execute the corresponding operation.

7. An apparatus for voice interaction control of a smart device, wherein the apparatus comprises: a processor and a computer readable medium, wherein the computer readable medium stores a computer readable code that is readable by the processor, and the processor executes the computer readable code to perform the following steps:
   monitoring and collecting in real time a voice signal emitted by a user of the smart device;
   conducting voice recognition to the collected voice signal; and
   according to a result of the voice recognition to the voice signal by the smart device, wakening a corresponding function of the smart device and judging whether to control the smart device to move, and if yes, acquiring a position of the user and controlling the smart device to move toward the user, to shorten a distance between the smart device and the user, and then recognizing a voice signal that the user again emits; and if not, directly according to the result of the voice recognition controlling the smart device to execute a corresponding operation;
acquiring a position of the user and controlling the smart device to move toward the user further comprises:
according to the collected voice signal, calculating by sound source localization to obtain position information of a sound source relative to the smart device, and according to the position information determining a distance and direction of the user relative to the smart device; and by using the determined distance and direction of the user relative to the smart device, controlling the smart device to move toward the user.

8. The apparatus according to claim 7, wherein acquiring a position of the user and controlling the smart device to move toward the user comprises:
controlling unit is for controlling the smart device to move toward the user to a first preset position, wherein a distance between the first preset position and the user is less than a first distance threshold.

9. The apparatus according to claim 8, wherein the processor executes the machine executable instructions further to implement steps:
according to a result of the voice recognition to the voice signal that the user again emits by the smart device, judging whether to control the smart device to move again, and if yes, controlling the smart device to move toward the user to a second preset position, wherein a distance between the second preset position and the user is less than a second distance threshold.

10. The apparatus according to claim 7, wherein conducting voice recognition to the collected voice signal comprises: recognizing out a wake-up word from the collected voice signal; and
according to a result of the voice recognition to the voice signal by the smart device, wakening a corresponding function of the smart device and judging whether to control the smart device to move comprises:
when the recognized-out wake-up word matches a saved preset wake-up word, wakening a corresponding function of the smart device and controlling the smart device to move.

11. The apparatus according to claim 7, wherein conducting voice recognition to the collected voice signal comprises: recognizing out a wake-up word and a commanding word from the collected voice signal; and
according to a result of the voice recognition to the voice signal by the smart device, wakening a corresponding function of the smart device and judging whether to control the smart device to move comprises:
when the wake-up word matches a saved preset wake-up word and the commanding word does not match a saved preset commanding word, wakening a corresponding function of the smart device and controlling the smart device to move; and when the wake-up word matches a saved preset wake-up word and the commanding word matches a saved preset commanding word, wakening a corresponding function of the smart device and according to an instruction of the commanding word controlling the smart device to execute the corresponding operation.

12. The apparatus according to claim 7, wherein according to a result of the voice recognition to the voice signal by the smart device, wakening a corresponding function of the smart device and judging whether to control the smart device to move comprises:
determining by distance localization position coordinates of the user and current position coordinates of the smart device in an indoor space, according to the determined position coordinates of the user and a preset first distance threshold, calculating to obtain corresponding position coordinates of a first preset position, by indoor navigation, generating a preset path that uses the current position coordinates of the smart device as a starting point and the corresponding position coordinates of the first preset position as an end point, and controlling in real time the smart device to move to the first preset position along the preset path and with a preset constant step length.

13. An apparatus for voice interaction control of a smart device, the smart device is a service robot, wherein the apparatus comprises a processor and a machine readable storage medium, the machine readable storage medium stores machine executable instructions that are executable by the processor, and the processor executes the machine executable instructions to implement steps as follows:
monitoring and collecting in real time a voice signal emitted by a user of the smart device;
conducting voice recognition to the collected voice signal; and
according to a result of the voice recognition to the voice signal by the smart device, wakening a corresponding function of the smart device and judging whether to control the smart device to move, and if yes, acquiring a position of the user and controlling the smart device to move toward the user, to shorten a distance between the smart device and the user, and then recognizing a voice signal that the user again emits; and if not, directly according to the result of the voice recognition controlling the smart device to execute a corresponding operation;
acquiring a position of the user and controlling the smart device to move toward the user comprises:
controlling the smart device to move toward the user to a first preset position, wherein a distance between the first preset position and the user is less than a first distance threshold;
according to the collected voice signal, calculating by sound source localization to obtain position information of a sound source relative to the smart device, and according to the position information determining a distance and direction of the user relative to the smart device; and
by using the determined distance and direction of the user relative to the smart device, controlling the smart device to move toward the user.

14. The apparatus according to claim 13, wherein the processor executes the machine executable instructions further to implement steps:
according to a result of the voice recognition to the voice signal that the user again emits by the smart device, judging whether to control the smart device to move again, and if yes, controlling the smart device to move toward the user to a second preset position, wherein a distance between the second preset position and the user is less than a second distance threshold.

15. The apparatus according to claim 13, wherein the step of conducting voice recognition to the collected voice signal comprises: recognizing out a wake-up word from the collected voice signal; and the step of according to a result of the voice recognition to the voice signal by the smart device, wakening a corresponding function of the smart device and judging whether to control the smart device to move comprises:
when the recognized-out wake-up word matches a saved preset wake-up word, wakening a corresponding function of the smart device and controlling the smart device to move.

16. The apparatus according claim 13, wherein the step of by using the determined distance and direction of the user relative to the smart device, controlling the smart device to move toward the user comprises:
determining by distance localization position coordinates of the user and current position coordinates of the smart device in an indoor space,
according to the determined position coordinates of the user and preset first distance threshold, calculating to obtain corresponding position coordinates of the first preset position, and
by indoor navigation, generating a preset path that uses the current position coordinates of the smart device as a starting point and the corresponding position coordinates of the first preset position as an end point, and controlling in real time the smart device to move to the first preset position along the preset path and with a preset constant step length.

17. The apparatus according to claim 13, wherein the step of conducting voice recognition to the collected voice signal comprises: recognizing out a wake-up word and a commanding word from the collected voice signal; and
the step of according to a result of the voice recognition to the voice signal by the smart device, wakening a corresponding function of the smart device and judging whether to control the smart device to move comprises:
when the recognized-out wake-up word matches a saved preset wake-up word and the recognized-out commanding word does not match a saved preset commanding word, wakening a corresponding function of the smart device and controlling the smart device to move; and
when the recognized-out wake-up word matches a saved preset wake-up word and the recognized-out commanding word matches a saved preset commanding word, wakening a corresponding function of the smart device and according to an instruction of the commanding word controlling the smart device to execute the corresponding operation.

\* \* \* \* \*